United States Patent
Hughes et al.

(10) Patent No.: US 6,962,214 B2
(45) Date of Patent: Nov. 8, 2005

(54) ROTARY SEAL FOR DIRECTIONAL DRILLING TOOLS

(75) Inventors: Peter Raymond Hughes, Stroud (GB); Nigel Dennis Griffin, Nympsfield (GB); Mark A. Colebrook, Cheltenham (GB)

(73) Assignee: Schlumberger WCP Ltd. (GB)

( * ) Notice: Subject to any disclaimer, the term of this patent is extended or adjusted under 35 U.S.C. 154(b) by 639 days.

(21) Appl. No.: 09/683,358

(22) Filed: Dec. 18, 2001

(65) Prior Publication Data

US 2002/0139584 A1 Oct. 3, 2002

Related U.S. Application Data

(60) Provisional application No. 60/281,054, filed on Apr. 2, 2001.

(51) Int. Cl.⁷ ............................................. E21B 34/08
(52) U.S. Cl. ......................... 175/107; 175/45; 175/74; 166/317
(58) Field of Search ............................ 175/45, 24, 38, 175/74, 107; 166/373, 374, 316, 319, 321

(56) References Cited

U.S. PATENT DOCUMENTS

| | | |
|---|---|---|
| 712,887 A | 11/1902 | Wyczynski |
| 1,971,480 A | 8/1934 | Earley |
| 2,345,766 A | 4/1944 | Miller |
| 2,585,207 A | 2/1952 | Zublin |
| 2,687,282 A | 8/1954 | Sanders |
| 2,694,549 A | 11/1954 | James |
| 2,712,434 A | 7/1955 | Giles |
| 2,857,141 A | 10/1958 | Carpenter |
| 3,062,303 A | 11/1962 | Schultz |
| 3,092,188 A | 6/1963 | Farris et al. |
| 3,123,162 A | 3/1964 | Rowley |
| 3,225,843 A | 12/1965 | Ortloff et al. |
| 3,512,592 A | 5/1970 | Kellner |
| 3,997,008 A | 12/1976 | Kellner |
| 4,022,287 A | 5/1977 | Lundstrom et al. |
| 4,190,123 A | 2/1980 | Roddy |

(Continued)

FOREIGN PATENT DOCUMENTS

| | | |
|---|---|---|
| EP | 0 459 008 B1 | 5/1996 |
| EP | 0 874 128 A2 | 10/1998 |
| WO | WO 01/34935 A1 | 5/2001 |

OTHER PUBLICATIONS

English language abstract of EP 0 459 008 A2, published Dec. 4, 1991; Applicant: Eastman Christensen Company; filed Aug. 21, 1990.

Application No. EP 02 25 1373, filed Feb. 27, 2002: European Search Report, "Documents Considered to be Relevant," search completed Jul. 2, 2002.

*Primary Examiner*—Frank Tsay
(74) *Attorney, Agent, or Firm*—Jeffrey E. Daly

(57) ABSTRACT

A rotary valve assembly for a rotary steerable tool is disclosed for directing flow of an abrasive laden drilling fluid; the valve assembly has a first sealing surface rotatably engaging a second sealing surface. At least one of the surfaces has at least about 5% of its area comprising interconnecting voids to an average depth of at least 0.02 mm. The interconnected voids allow fluid pressure to equalize between the sealing faces by flowing through the interconnecting voids to the sealing surfaces. Because the fit of the sealing surfaces of the valve is less than perfect, and because the voids on mating surfaces do not necessarily overlap, the 5% of the surface area comprising interconnected voids can easily translate to a 10% or more reduction in sealed area when both sealing surfaces have the interconnecting voids. The additional reduction in surface area subjected to differential pressure has substantially eliminated the hydraulic lock problem previously encountered upon startup.

17 Claims, 2 Drawing Sheets

U.S. PATENT DOCUMENTS

| | | | |
|---|---|---|---|
| 4,211,292 A | 7/1980 | Evans |
| 4,224,380 A | 9/1980 | Bovenkerk et al. |
| 4,305,474 A | 12/1981 | Farris et al. |
| 4,416,339 A | 11/1983 | Baker et al. |
| 4,449,595 A | 5/1984 | Holbert |
| 4,635,736 A | 1/1987 | Shirley |
| 4,690,229 A | 9/1987 | Raney |
| 4,699,224 A | 10/1987 | Burton |
| 4,836,301 A | 6/1989 | Van Dongen et al. |
| 4,842,083 A | 6/1989 | Raney |
| 4,886,130 A | 12/1989 | Evans |
| 4,947,944 A | 8/1990 | Coltman et al. |
| 4,948,925 A | 8/1990 | Winters et al. |
| 5,000,272 A | 3/1991 | Wiebe et al. |
| 5,099,934 A | 3/1992 | Barr |
| 5,103,919 A | 4/1992 | Warren et al. |
| 5,109,935 A | 5/1992 | Hawke |
| 5,113,953 A | 5/1992 | Noble |
| 5,265,682 A | 11/1993 | Russell et al. |
| 5,507,353 A | 4/1996 | Pavone |
| 5,520,255 A | 5/1996 | Barr et al. |
| 5,553,678 A | 9/1996 | Barr et al. |
| 5,553,679 A | 9/1996 | Thorp |
| 5,560,716 A | 10/1996 | Tank et al. |
| 5,603,385 A | 2/1997 | Colebrook |
| 5,673,763 A | 10/1997 | Thorp |
| 5,685,379 A | 11/1997 | Barr et al. |
| 5,695,015 A | 12/1997 | Barr et al. |
| 5,706,905 A | 1/1998 | Barr |
| 5,803,185 A | 9/1998 | Barr et al. |
| 5,971,085 A | 10/1999 | Colebrook |
| 6,082,470 A | 7/2000 | Webb et al. |
| 6,089,332 A | 7/2000 | Barr et al. |
| 6,092,610 A | 7/2000 | Kosmala et al. |
| 6,109,372 A | 8/2000 | Corel et al. |
| 6,116,354 A | 9/2000 | Buytaert |

ROTARY SEAL FOR DIRECTIONAL DRILLING TOOLS

CROSS REFERENCE TO RELATED APPLICATIONS

This application claims priority from U.S. Provisional Patent Application Ser. No. 60/281,054 incorporated by reference herein by Nigel Griffin and Peter Hughes, filed Apr. 2, 2001, now pending.

BACKGROUND OF THE INVENTION

1. Field of the Invention.

This invention relates to a rotary seal for a directional drilling tool, which is useful when drilling boreholes into the earth.

2. Description of the Related Art.

When drilling boreholes into sub-surface formations, it is desirable to be able to vary the direction of drilling. For example to direct the borehole toward a desirable target or to control the direction, a rotary steerable tool may be used in a drill string to change the direction of the borehole. It may also be desirable to correct for deviations from the desired direction when drilling a straight hole. Furthermore, directional drilling tools may also be used to control the direction of the hole to avoid obstacles.

Typical rotary steerable tools are shown for example in U.S. Pat. Nos. 5,603,385; 5,520,255 and 5,706,905 all herein incorporated by reference for all they disclose. Typically, bias units within these rotary steerable tools comprise a number of hydraulic actuators spaced apart around the periphery of the unit. Each actuator may have a movable thrust member which is hydraulically displaced outwardly for engagement with the formation of the borehole being drilled. Typically, each actuator also has an inlet passage for connection to a source of drilling fluid under pressure and an outlet passage communicating the annulus of the borehole. A selector control valve connects the inlet passages in succession to the source of fluid under pressure as the bias unit rotates. This modulates the fluid pressure supplied to each actuator in synchronism with the rotation of the drill bit and in selective phase relation thereto. As a result, as the drill bit rotates, each movable thrust member is displaced outwardly at the same rotational position so as to bias the drill laterally and therefore control the direction of drilling.

Rotary steerable tools are typically designed as a single unit comprising a selector control valve assembly, a plurality of actuators, and logic systems to control these actuators. In operation, however, because power to actuate the valve assembly is limited, the valves have been known to stick. One probable reason for these valves sticking is the force applied to the valve by the differential pressure of the drilling fluid. Particularly, when the valve is initially actuated, this hold down force can require the starting torque of the valve to be higher than the torque available in the actuator. In the past, this condition has caused failure of the tool and an expensive trip of the drill string from the hole.

It was initially believed that the valves became stuck due to a tribological buildup between the valve faces as described in U.S. Pat. No. 5,560,716 incorporated herein by reference for all it discloses. This patent describes a tribological buildup of the cobalt binder material on the faces of heavily loaded polycrystalline diamond bearing elements, leading to an increase in the operating torque. The patent teaches that this buildup can be alleviated by an acid wipe. However, since the sticking often occurred on initial startup, there was no relative rotation of the valve bodies under load to cause this tribological buildup, so any benefit from this treatment was at best only partially effective. Therefore, it is now believed that other factors independent of the valve material composition contribute to problem, as will be described.

Another problem with these prior art valve assemblies is that during operation, pressure surges in the drilling fluid can suddenly increase the load on the valve such that the operating torque of the valve exceeds the torque available by the actuator. It is believed that this is caused by the hydrostatic pressure being exerted across the relatively smooth surface of these selector valves exceeding the hydrodynamic lubrication effect of the fluid.

An additional problem with these units has been a sudden reverse flow of drilling fluid through the valve assembly caused under conditions when the source of pressurized fluid at the surface has been suddenly stopped or when one or more of the actuators are rapidly forced closed. This has been known to cause the valve surfaces to become separated. Since the valve design relies upon the differential pressure of the drilling fluid to provide sealing force, when the valve faces become separated, there is sometimes not enough differential pressure to force the valve surfaces back into contact.

SUMMARY OF THE INVENTION

Disclosed is a rotary valve assembly for directing flow of an abrasive laden drilling fluid, the valve assembly comprising a first sealing surface rotatably engaging a second sealing surface. At least one of the surfaces has at least about 5% of its area comprising interconnecting voids to an average depth of at least 0.02 mm.

The interconnected voids allow fluid pressure to equalize between the sealing faces by allowing flow through the interconnecting voids to the sealing surfaces. Because the fit of the sealing surfaces of the valve is less than perfect, and because the voids on mating surfaces do not necessarily overlap, the 5% of the surface area comprising interconnected voids can easily translate to a 10% or more reduction in sealed area when both sealing surfaces have the interconnecting voids. This additional 10% total reduction in surface area subjected to differential pressure has substantially eliminated the hydraulic lock problem encountered upon startup.

The rotary valve assembly may be made of a polycrystalline diamond material. The polycrystalline diamond may be formed with a binder-catalyzing material in a high-temperature, high-pressure process. The polycrystalline diamond has a plurality of partially bonded diamond or diamond-like crystals forming at least one continuous diamond matrix, and the interstices among the diamond crystals forming at least one continuous interstitial matrix containing a catalyzing material. The polycrystalline diamond has a sealing surface where a portion of the interstitial matrix adjacent to the sealing surface is substantially free of the catalyzing material, and the remaining interstitial matrix contains the catalyzing material. The portion of the interstitial matrix free of the catalyzing material forms a porous sealing surface with at least about 5% of its surface area comprising interconnected voids with an average depth D of at least 0.02 mm.

Alternatively, the rotary valve assembly may be made of cermets, ceramics and reaction bonded silicon carbide. After the selector valve bodies are made to their final shape, the sealing surface is treated to cause voids to form to a depth D from the sealing surface a distance of at least 0.02 mm. The selector valve bodies are processed such that at least about 5% of the sealing surface area is formed with interconnected voids extending to a depth D from the sealing surface of at least 0.02 mm.

DETAILED DESCRIPTION

Figure 1:
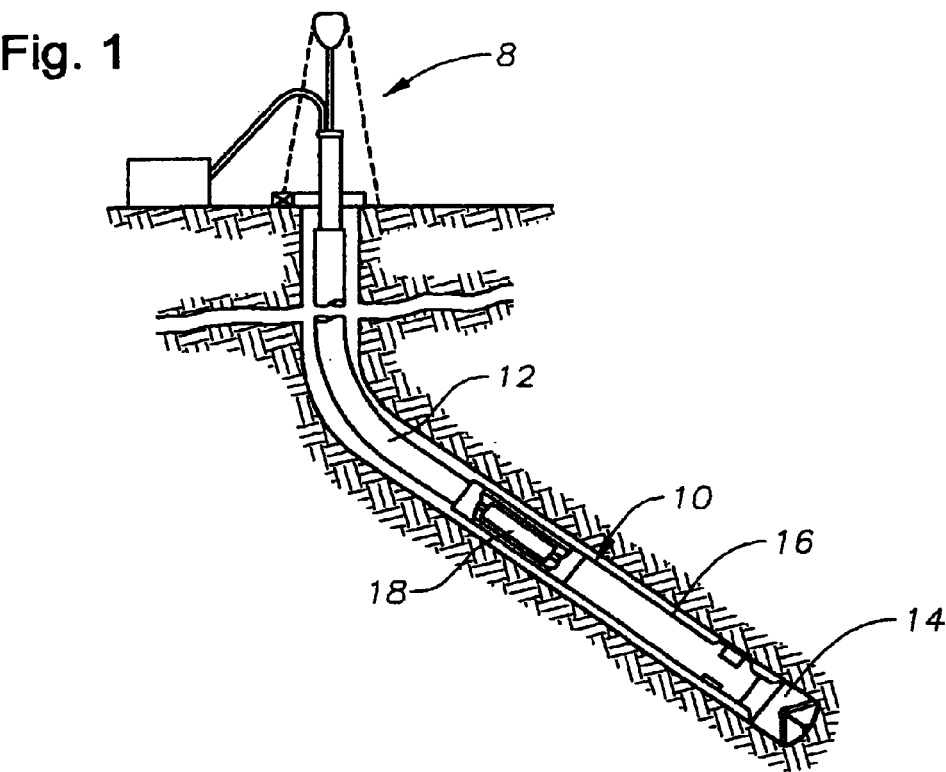
FIG. 1 is a perspective view of a bottom hole assembly within the earth typically used in the practice of the present invention.
Figure 4:
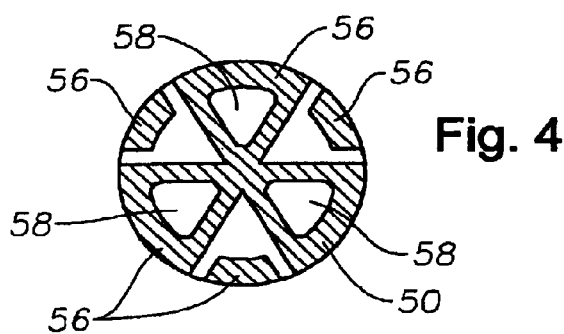
FIG. 4 is an end view of the stationary valve face of the valve assembly of the present invention.

When drilling directional boreholes into earthen formations, it is common practice to use a bottom hole assembly as shown in FIG. 1. The bottom hole assembly, generally indicated as 10, is typically connected to the end of the tubular drill string 12 which is typically rotatably driven by a drilling rig 8 from the surface. In addition to providing motive force for rotating the drill string 12, the drilling rig 8 also supplies a drilling fluid under pressure through the tubular drill string 12 to the bottom hole assembly 10. The drilling fluid is typically laden with abrasive material, as it is repeatedly re-circulated through the borehole. In order to achieve directional control while drilling, components of the bottom hole assembly 10 include a drill bit 14, a modulated bias unit 16, and a roll stabilized control unit 18. The bias unit 16 is connected to and controlled by the roll stabilized control unit 18, which controls operation of the bias unit 16 in accordance with a pre-determined program or in accordance with signals transmitted to control unit 18 from the surface. The bias unit 16 may be controlled to apply a lateral bias to the drill bit 14 in the desired direction so as to control the direction of the drilling.

Figure 2:
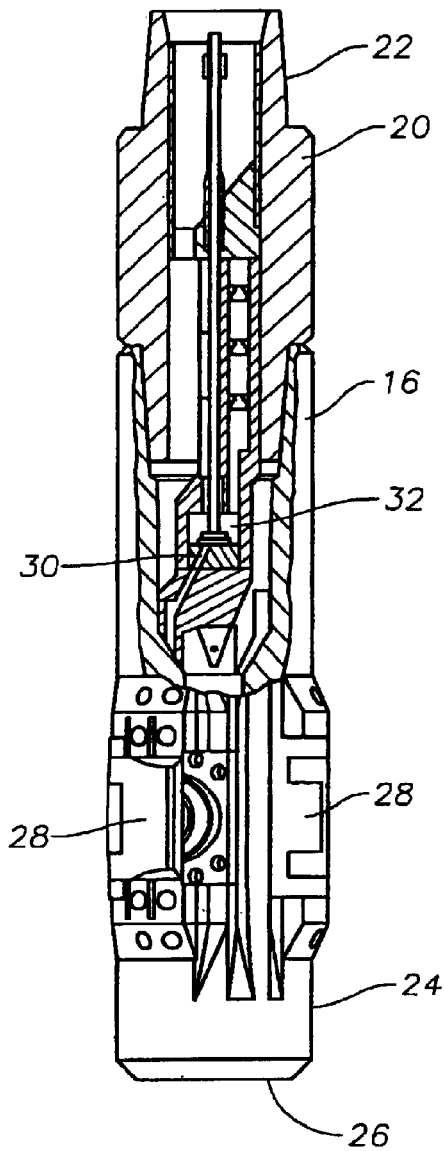
FIG. 2 is a partial cross section view of a modulated bias unit containing the valve assembly of the present invention.

Referring now to FIG. 2, the modulated bias unit 16 comprises an elongated main body structure 20 provided at its upper end with a threaded pin 22 for connecting via an end to the roll stabilized control unit 18, which is in turn connected to the end of the drill string 12. As previously described, the modulated bias unit 16 has an elongated main body structure 20. The lower end 24 of the body structure 20 is formed with a socket 26 to receive the threaded pin of the drill bit 14. The drill bit 14 may be of any type.

There are provided around the periphery of the bias unit 16, a plurality of equally spaced hydraulic actuators 28. Each actuator 28 is supplied drilling fluid under pressure through a passage 30 in the bias unit 16 under control of a valve assembly 32. In operation, a portion of the valve assembly 32 is rotated relative to the bias unit 16 to divert the pressurized drilling fluid supplied from the surface sequentially to the actuators 28 in turn. The rotation is controlled by the roll stabilized control unit 18 in synchronism with the rotation of the drill bit 14 and in selective phase relation thereto. As is well known, as the drill bit 14 rotates, each actuator 28 is therefore displaced outwardly at the same rotational position so as to bias the drill bit 14 laterally, and therefore control the direction of drilling.

Figure 3:
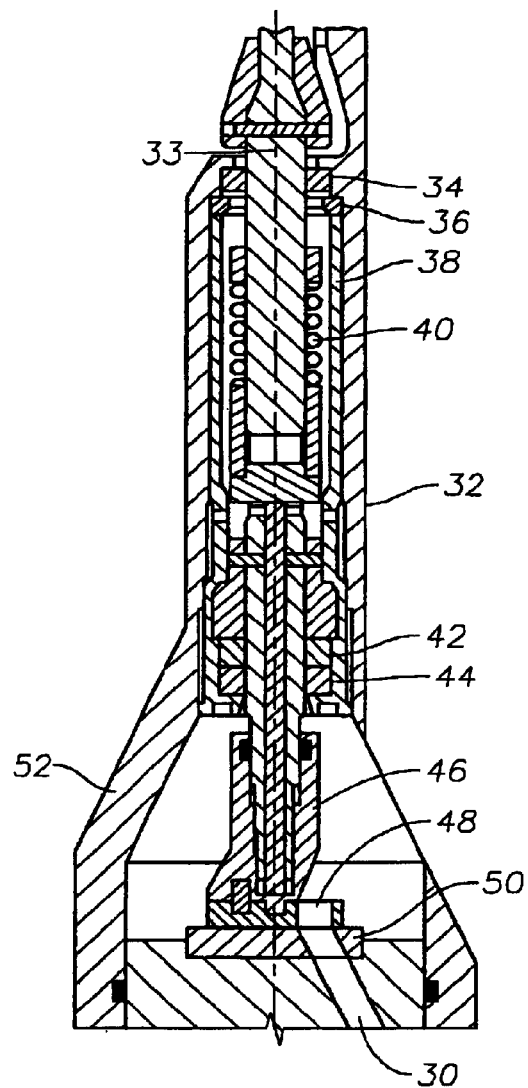
FIG. 3 is a cross sectional view of the valve assembly of the present invention.

An enlarged cross sectional view of the valve assembly 32 of the present invention is shown in FIG. 3. The valve assembly 32 is contained within a valve assembly housing 52 and has a control shaft 33 which is driven by the roll stabilized control unit 18. Within the valve assembly 32 is an upper seal 34, an upper bearing 36 contained in a spring housing 38. The spring housing 38 has a load spring 40 and related hardware to apply a preload as will be explained later. Finally, the valve assembly 32 has a lower bearing 42 and a lower seal 44.

In operation, the control shaft 33 transmits torque to a rotor assembly 46 through the spring housing 38 to a rotating selector valve body 48. The spring housing 38 and load spring 40 are arranged such that in operation the load spring 40 applies a preload through the rotor assembly 46 and rotating selector valve body 48 to the stationary selector valve body 50.

In this specification, the terms "rotating" and "stationary" referring to the two selector valve bodies is relative to the body 20 of the bias unit 16 and are provided here for convenience in describing the present invention. Since the bias unit 16 is rotated with respect to the earth in operation, the rotating selector valve body 48 may well be stationary with respect to the earth when driven by the roll stabilized control unit 18.

Figure 5:
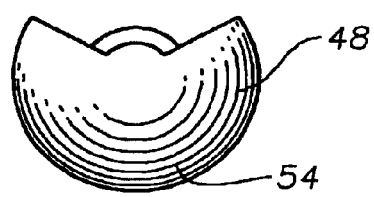
FIG. 5 is an end view of the rotating valve face of the valve assembly of the present invention.
Figure 6:
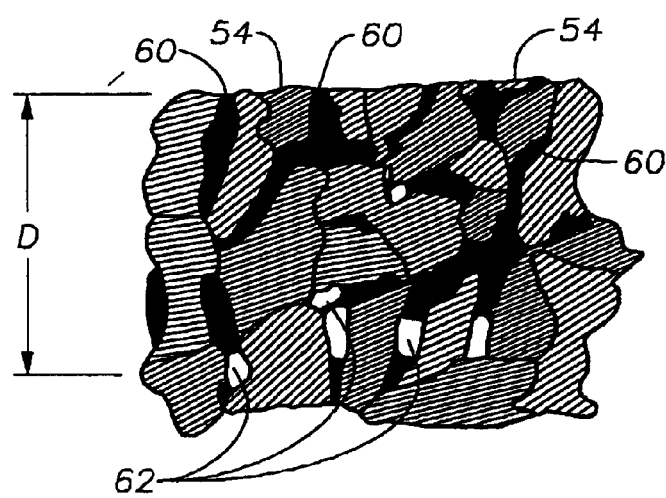
FIG. 6 is a micro-structural representation of the areas adjacent to the sealing surface of the valve assembly of the present invention.

Referring now to FIGS. 5 and 6, a first sealing surface 54 on the rotating selector valve body 48 is configured as a partial circular section, as illustrated. When the first sealing surface 54 is properly aligned with the second sealing surface 56, one of the outlet orifices 58 in the stationary selector valve body 50 is exposed to the pressurized drilling fluid within the valve assembly housing 52. These outlet orifices 58 are sequentially exposed in operation by the rotating selector valve assembly 48 to be in fluid communication with passages (for example passage 30) to provide fluid to operate the actuators 28, as earlier described.

The differential pressure of the pressurized drilling causes the first sealing surface 54 to load onto the second sealing surface 56. To reduce the amount of this hydraulic load, portions 56 of the total face area of the stationary selector valve body 50 are relieved to reduce the surface area of the stationary selector valve body 50 exposed to the differential pressure of the drilling fluid. The size of the outlet orifices 58 limits the total area of the stationary selector valve body 50 that can be relieved. Therefore, the amount of surface area reduction is limited by the mechanical constraints of the valve. Typically, no more than about 50% of the total face area of the stationary selector valve body 50 can be relieved. What remains is the sealing area. This does reduce the torque required to operate the valve assembly 32. However, although relieving the sealing surface 56 allows for more reliable operation, the differential pressure acting on the valve faces causes the valve assembly 32 to stick at times in operation.

The effect of this differential pressure is particularly challenging upon initial startup of the valve assembly 32. When the valves bodies 48, 50 are not rotating with respect to one another, the load spring 40 urges the valve"s sealing surfaces 54, 56 together. This tends to squeeze out the fluid trapped between the valve sealing surfaces 54, 56 leading to hydraulic lock.

The load spring 40 also urges the sealing surfaces 54, 56 back into contact during times in operation when they may separate. Although this is an unusual situation, it is possible that without the load spring 40, sealing surfaces 54, 56 would remain separated, rendering the tool inoperative.

Referring now to FIG. 6, either or both of the selector valve bodies 48, 50 are made of a material that is processed to provide the sealing surfaces 54, 56 with a porous structure. For convenience in this specification, only the rotating selector valve body 48 with the sealing surface 54 will be used to illustrate its operation, structure and composition. This is not intended to limit the invention to this particular valve body in any manner, as the porous structure may be in either or both of sealing surfaces 54, 56 of selector valve bodies 48, 50.

A common problem in prior selector valves was their tendency to exhibit very high starting torques at initial rotation after the pressurization of the drilling fluid. Oftentimes, this breakout torque was higher than what the roll stabilized control unit 18 could provide and resulted in an expensive and time consuming "trip" to replace or repair the valve. This torque is further exacerbated by the action of the load spring 40.

Reducing the surface area of the sealing surfaces 54, 56 helped to reduce the breakout torque. However, it has been found that when the sealing surface 54 was provided with about 5% or more of its surface area comprising interconnected voids 60 with an average depth D of at least 0.02 mm, the breakout torque problem was practically eliminated. It is believed that the interconnected voids 60 exposed at the surface allow limited fluid communication below the sealing surface 54. This allows differential pressures to slowly equalize between the sealing surfaces 54, 65. This not only helps prevent hydraulic lock, it also provides a source of fluid for hydrodynamic lubrication of the sealing surface 54.

One method to provide this porous structure is to make either or both selector valve bodies 48, 50 of a polycrystalline diamond material. The polycrystalline diamond may be formed with a binder-catalyzing material in a high-temperature, high-pressure process. The polycrystalline diamond has a plurality of partially bonded diamond or diamond-like crystals having an average crystal size of from about 0.01 mm to 0.1 mm or larger in diameter. These crystals form at least one continuous diamond matrix, and the interstices among the diamond crystals forming at least one continuous interstitial matrix containing a catalyzing material. The polycrystalline diamond has a sealing surface 54 where a portion of the interstitial matrix adjacent to the sealing surface 54 is substantially free of the catalyzing material, and the remaining interstitial matrix contains the catalyzing material. The portion of the interstitial matrix adjacent to the sealing surface 54 that is free of the catalyzing material forms a porous surface with at least about 5% of its surface area comprising interconnected voids 60 with an average depth D of at least 0.02 mm from the surface 54. In order for the voids 60 to be interconnected below the surface 54, they need to extend from the surface 54 to a depth greater than the average diameter of the crystals. In the preferred embodiment, the depth D of the interconnected voids 60 from the surface 54 is a distance of at least 0.05 mm. The increased depth allows a more rapid equalization of pressures and provides more material at the sealing surface 54 in the event it should wear in use.

Other suitable materials for the selector valve bodies 48, 50 would include cermets, ceramics and reaction bonded silicon carbide. After the selector valve bodies 48, 50 are made to their final shape, the sealing surface 54 is treated to cause voids 60 to form below the surface 54. Alternatively, the voids could be introduced into the selector valve bodies 48, 50 during forming. In any event, the selector valve bodies 48, 50 are processed such that at least about 5% of the sealing surface 54 area is formed with interconnected voids 60 extending to a depth D from the sealing surface 54 of at least 0.02 mm.

There are many other materials and methods that may be suitable for providing a sealing surface 54 with at least about 5% of its surface area comprising interconnected voids 60 with an average depth D from the sealing surface 54 of at least 0.02 mm. However, the effect of all is the same. The interconnected voids 60 allow fluid pressure to equalize between the sealing faces by flowing through the interconnecting voids 60 to the sealing surfaces 54, 56. Because the fit of the sealing surfaces 54, 56 valve is less than perfect, and because the voids on mating surfaces do not necessarily overlap, the 5% of the surface area comprising interconnected voids 60 can easily translate to a 10% or more reduction in sealed area when both sealing surfaces 54, 56 have the interconnecting voids 60. This additional 10% total reduction in surface area subjected to differential pressure has substantially eliminated the hydraulic lock problem encountered upon startup.

Whereas the present invention has been described in particular relation to the drawings attached hereto, it should be understood that other and further modifications apart from those shown or suggested herein, may be made within the scope and spirit of the present invention.

What is claimed is:

1. A rotary valve assembly for directing flow of a pressurized drilling fluid, the valve assembly comprising a first sealing surface rotatably engaging a second sealing surface, wherein an area of at least one of said sealing surfaces comprises at least about 5% interconnecting voids, the voids having an average depth from said one of said surfaces of at least 0.02 mm.

2. The rotary valve assembly of claim 1 wherein the first sealing surface and the second sealing surface are preloaded with a load spring.

3. The rotary valve assembly of claim 2 further comprising upper and lower seals, and upper and lower bearings contained in a spring housing.

4. The rotary valve assembly of claim 3 arranged in flow communication with a plurality of spaced hydraulic actuators to supply the actuators the drilling fluid.

5. The rotary valve assembly of claim 4 arranged within a roll stabilized bias unit, wherein the hydraulic actuators apply a lateral bias to a drill bit so as to provide directional control while drilling a borehole into the earth.

6. The rotary valve assembly of claim 1 wherein the second sealing surface comprises a stationary selector valve body having a total face area, about 50% of said area relieved to decrease a hydraulic loading on the rotary valve assembly.

7. The rotary valve assembly of claim 1 wherein the said one of said surfaces is formed of a polycrystalline diamond material having a plurality of partially bonded diamond crystals forming at least one continuous diamond matrix, and interstices among the diamond crystals forming at least one continuous interstitial matrix containing a catalyzing material, wherein a portion of the interstitial matrix adjacent to said one of said surfaces is substantially free of the catalyzing material, and the remaining interstitial matrix contains the catalyzing material.

8. The rotary valve assembly of claim 7 wherein the portion of the interstitial matrix adjacent to said one of said surfaces that is free of the catalyzing material forms a porous surface of the interconnected voids.

9. The rotary valve assembly of claim 8 wherein the diamond crystals have an average crystal size of greater than about 0.01 mm.

10. The rotary valve assembly of claim 9 wherein the interconnected voids extend to a depth of at least 0.05 mm below said one of said surfaces.

11. A rotary steerable tool comprising a rotary valve assembly for directing flow of a pressurized drilling fluid, the valve assembly comprising a first sealing surface rotatably engaging a second sealing surface, wherein an area of at least one of said surfaces comprises at least about 5% interconnecting voids, the voids having an average depth from said one of said surfaces of at least 0.02 mm, the valve assembly arranged in flow communication with a plurality of spaced hydraulic actuators to supply the actuators the drilling fluid and arranged within a roll stabilized bias unit, wherein the hydraulic actuators apply a lateral bias to a drill bit so as to provide directional control while drilling a borehole into the earth.

12. The rotary steerable tool of claim 11 wherein said one of said surfaces is formed of a polycrystalline diamond material having a plurality of partially bonded diamond crystals forming at least one continuous diamond matrix, and interstices among the diamond crystals forming at least one continuous interstitial matrix containing a catalyzing material, wherein a portion of the interstitial matrix adjacent to said one of said surfaces is substantially free of the catalyzing material, and the remaining interstitial matrix contains the catalyzing material.

13. The rotary steerable tool of claim 12 wherein the portion of the interstitial matrix adjacent to said one of said surfaces that is free of the catalyzing material forms a porous surface of the interconnected voids.

14. The rotary steerable tool of claim 13 wherein the diamond crystals have an average crystal size of greater than about 0.01 mm.

15. The rotary valve assembly of claim 14 wherein the interconnected voids extend to a depth of at least 0.05 mm below said one of said surfaces.

16. The rotary steerable tool of claim 11 wherein the second sealing surface comprises a stationary selector valve body having an area, about 50% of said area relieved to decrease a hydraulic loading on the rotary valve assembly.

17. The rotary steerable tool of claim 16 wherein the first sealing surface and the second sealing surface are preloaded with a load spring.

\* \* \* \* \*